(12) United States Patent
Yim et al.

(10) Patent No.: US 10,168,578 B2
(45) Date of Patent: Jan. 1, 2019

(54) DISPLAY SUBSTRATE AND LIQUID CRYSTAL DISPLAY DEVICE COMPRISING THE SAME

(71) Applicant: SAMSUNG DISPLAY CO., LTD., Yongin-si, Gyeonggi-do (KR)

(72) Inventors: Taekyung Yim, Seoul (KR); Suwan Woo, Osan-si (KR); Keunwoo Park, Incheon (KR); Nakcho Choi, Hwaseong-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 37 days.

(21) Appl. No.: 15/208,854

(22) Filed: Jul. 13, 2016

(65) Prior Publication Data

US 2017/0131595 A1    May 11, 2017

(30) Foreign Application Priority Data

Nov. 6, 2015   (KR) ........................ 10-2015-0155923

(51) Int. Cl.

| | | |
|---|---|---|
| *G02F 1/1334* | (2006.01) | |
| *G02F 1/1337* | (2006.01) | |
| *G02F 1/1335* | (2006.01) | |
| *G02F 1/1343* | (2006.01) | |
| *G02F 1/1362* | (2006.01) | |
| *G02F 1/1333* | (2006.01) | |

(52) U.S. Cl.
CPC .. *G02F 1/133707* (2013.01); *G02F 1/133512* (2013.01); *G02F 1/134309* (2013.01); *G02F 1/136209* (2013.01); *G02F 1/136227* (2013.01); *G02F 1/136286* (2013.01); *G02F 1/133345* (2013.01); *G02F 2001/133761* (2013.01); *G02F 2001/133776* (2013.01); *G02F 2201/122* (2013.01); *G02F 2201/123* (2013.01)

(58) Field of Classification Search
CPC ......... G02F 1/133707; G02F 1/136286; G02F 1/136209; G02F 1/134309; G02F 1/133345; G02F 1/136227; G02F 1/133512; G02F 2001/133761; G02F 2201/122; G02F 2001/133776; G02F 2201/123

See application file for complete search history.

(56) References Cited

U.S. PATENT DOCUMENTS

| | | | |
|---|---|---|---|
| 8,643,813 B2 | 2/2014 | Lee et al. | |
| 9,069,196 B2 | 6/2015 | Yun et al. | |
| 2010/0328290 A1* | 12/2010 | Jeong | G02F 1/133555 345/211 |
| 2013/0101755 A1* | 4/2013 | Lee | G02F 1/133707 428/1.23 |
| 2013/0242239 A1 | 9/2013 | Chang et al. | |
| 2013/0265533 A1* | 10/2013 | Lim | G02F 1/133707 349/130 |

FOREIGN PATENT DOCUMENTS

| | | |
|---|---|---|
| KR | 10-2013-0101325 A | 9/2013 |
| KR | 10-2013-0104521 A | 9/2013 |
| KR | 10-2013-0104830 A | 9/2013 |

* cited by examiner

*Primary Examiner* — Kevin Quarterman
(74) *Attorney, Agent, or Firm* — Lee & Morse P.C.

(57) ABSTRACT

A display substrate may include a base substrate having a plurality of pixel areas; and a pixel electrode in the pixel area. The pixel electrode may include a bump portion defining a plurality of domains and at least one slit extending along an edge of the pixel electrode in at least one domain.

26 Claims, 16 Drawing Sheets

DISPLAY SUBSTRATE AND LIQUID CRYSTAL DISPLAY DEVICE COMPRISING THE SAME

CROSS-REFERENCE TO RELATED APPLICATION

Korean Patent Application No. 10-2015-0155923, filed on Nov. 6, 2015, in the Korean Intellectual Property Office, and entitled: "Display Substrate and Liquid Crystal Display Device Comprising the Same," is incorporated by reference herein in its entirety.

BACKGROUND

1. Field

Example embodiments relate to a display substrate and a liquid crystal display ("LCD") device including the display substrate.

2. Description of the Related Art

Display devices are classified into liquid crystal display ("LCD") devices, organic light emitting diode ("OLED") display devices, plasma display panel ("PDP") devices, electrophoretic display ("EPD") devices, and the like, based on a light emitting scheme thereof.

An LCD device may include two substrates including electrodes formed thereon and a liquid crystal layer between the two substrates. Upon applying voltage to the electrodes, the LCD device rearranges liquid crystal molecules of the liquid crystal layer such that an amount of transmitted light is controlled. Such an LCD device generally includes an alignment layer that may align the liquid crystal molecules so as to uniformly control the liquid crystal layer.

SUMMARY

According to an embodiment, a display substrate may include a base substrate having a plurality of pixel areas; and a pixel electrode in the pixel area. The pixel electrode may include a bump portion defining a plurality of domains and at least one slit extending along an edge of the pixel electrode in at least one domain.

The bump portion may include a first bump portion extending in a first direction and a second bump portion extending in a second direction intersecting the first direction in a plan view.

An overlapping area of the first bump portion and the second bump portion may have a shape of a quadrangle, a circle, an ellipse, or a lozenge in a plan view.

At least one of the first bump portion and the second bump portion may have a width that increases as a distance from the overlapping area increases.

The first bump portion and the second bump portion may have widths that decrease as a distance from the overlapping area increases.

The first bump portion may have a width different from a width of the second bump portion.

The first bump portion may have a width greater than a width of the second bump portion.

The bump portion may have a width in a range of about 2 µm to about 15 µm.

The bump portion may have a height in a range of about 0.1 µm to about 1.0 µm.

The display substrate may further include at least one insulating layer between the base substrate and the pixel electrode, the insulating layer may include a projection having a substantially same shape as a shape of the bump portion in a plan view.

The display substrate may further include at least one protrusion pattern on the base substrate, the protrusion pattern having a substantially same shape as a shape of the bump portion in a plan view.

The protrusion pattern may include a first protrusion pattern on the base substrate and a second protrusion pattern on the first protrusion pattern, the second protrusion pattern being insulated from the first protrusion pattern.

The at least one slit may include a first slit formed in a first direction and a second slit formed in a second direction.

At least one of the first slit and the second slit may have a width that increases from an edge of the pixel electrode toward the bump portion.

At least one of the first slit and the second slit may overlap the bump portion.

The first slit may have a width different from a width of the second slit.

The first slit may have a width greater than a width of the second slit.

An end side of the first slit may form an acute angle with respect to the first direction.

An end side of the second slit may form an acute angle with respect to the second direction.

The slit may have a width in a range of about 2 µm to about 5 µm.

The pixel electrode may further include a notch portion extending from one side of the pixel electrode.

The notch portion may be connected to the bump portion.

The notch portion may have a width that decreases as a distance from the pixel electrode increases.

The pixel electrode may further include a connecting portion connected to the bump portion and to be connected to a thin film transistor.

The pixel electrode may have at least one edge that is chamfered.

According to an exemplary embodiment, a liquid crystal display ("LCD") device may include a display substrate; an opposing substrate facing the display substrate; and a liquid crystal layer between the display substrate and the opposing substrate. The display substrate may include a base substrate having a plurality of pixel areas; and a pixel electrode in the pixel area, the pixel electrode may include a bump portion defining a plurality of domains and at least one slit extending along an edge of the pixel electrode in at least one domain.

The LCD device may further include a common electrode on the opposing substrate, the common electrode not having a slit.

The display substrate may include a homeotropic alignment layer.

The homeotropic alignment layer may include a photopolymerization material.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
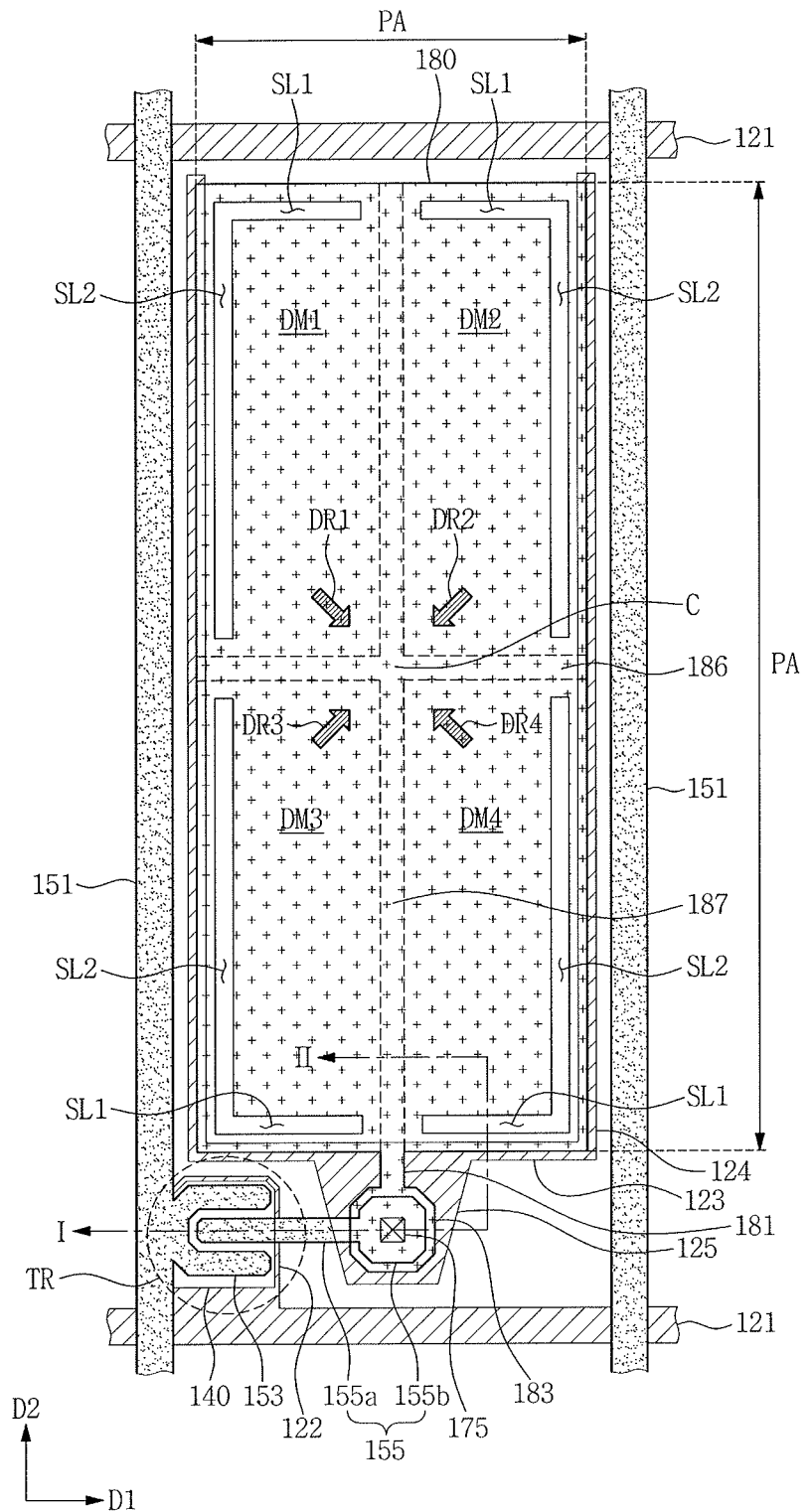
FIG. 1 illustrates a schematic plan view illustrating a pixel of a liquid crystal display ("LCD") device according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, a first exemplary embodiment will be described with reference to FIGS. 1, 2, 3, 4, 5, 6, and 7.

Figure 2:
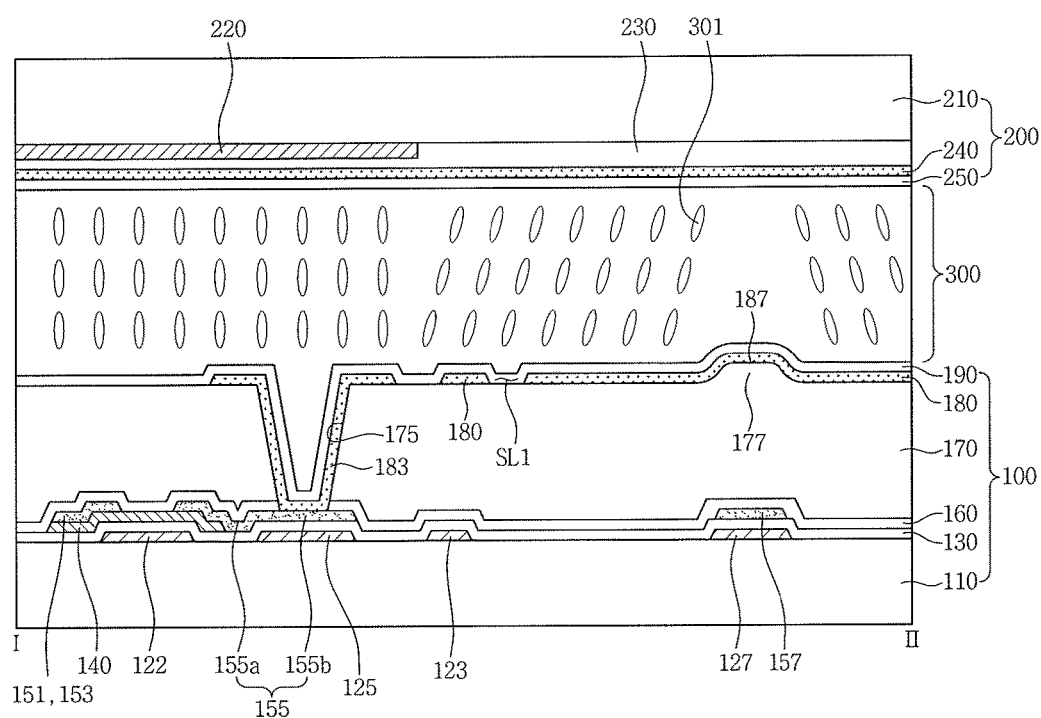
FIG. 2 illustrates a cross-sectional view taken along line I-II of FIG. 1.

FIG. 1 is a schematic plan view illustrating a pixel of a liquid crystal display ("LCD") device according to an exemplary embodiment, and FIG. 2 is a cross-sectional view taken along line I-II of FIG. 1. The LCD device according to the exemplary embodiments may include a plurality of pixels, but a single pixel among the plurality of pixels is illustrated in FIG. 1 while other pixels and pixel areas are omitted.

In reference to FIGS. 1 and 2, the LCD device according to an exemplary embodiment may include a display substrate 100, an opposing substrate 200, and a liquid crystal layer 300. The liquid crystal layer 300 may be interposed between the display substrate 100 and the opposing substrate 200 which may oppose each other. In an exemplary embodiment, the LCD device according to an exemplary embodiment may further include a backlight unit that emits light toward the display substrate 100.

The display substrate 100 may include a base substrate 110, a gate-layer conductor 120, a first insulating layer 130, a semiconductor layer 140, a data-layer conductor 150, a second insulating layer 160, a third insulating layer 170, a pixel electrode 180, a first alignment layer 190, and the like.

The base substrate 110 may be an insulating substrate, such as a plastic substrate, for example, which has light transmission characteristics and flexibility. However, the base substrate 110 may include a hard substrate such as a glass substrate, for example.

Figure 3:
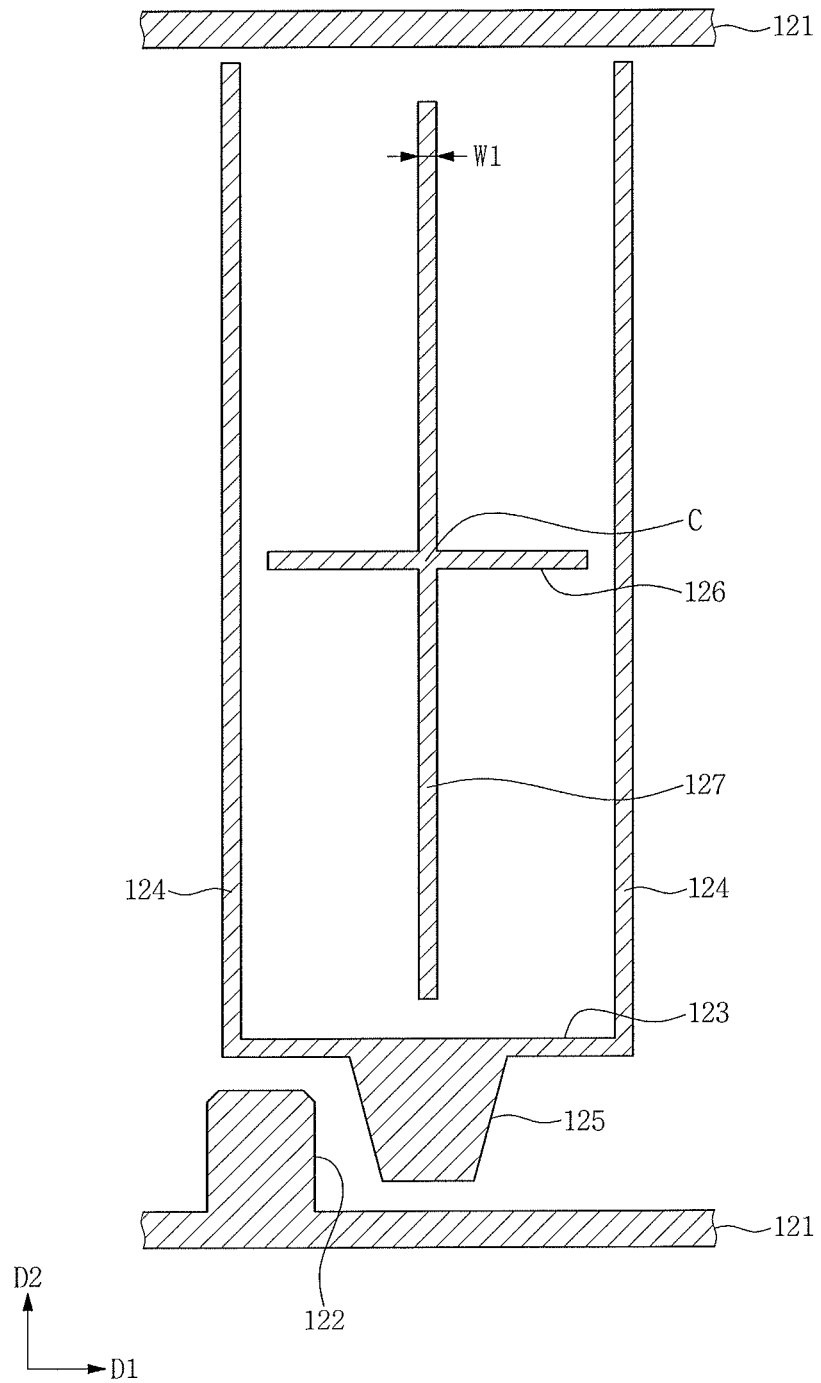
FIG. 3 illustrates a plan view separately illustrating a gate-layer conductor of FIG. 1.

FIG. 3 is a plan view separately illustrating the gate-layer conductor 120 of FIG. 1.

In reference to FIGS. 1, 2, and 3, the gate-layer conductor 120 may be disposed over the base substrate 110.

The gate-layer conductor 120 may include or be formed of, for example, aluminum (Al) or alloys thereof, silver (Ag) or alloys thereof, copper (Cu) or alloys thereof, molybdenum (Mo) or alloys thereof, chromium (Cr), tantalum (Ta), and titanium (Ti), and/or the like.

In an exemplary embodiment, the gate-layer conductor 120 may have a multilayer structure including two or more conducting layers having different physical properties from one another. For example, a conducting layer of the multilayer structure may include or be formed of metal having low resistivity, for example, an aluminum (Al)-based metal, a silver (Ag)-based metal, a copper (Cu)-based metal, and/or the like, so as to reduce signal delay or voltage drop. On the other hand, another conducting layer of the multilayer structure may include a material that is found to impart an excellent contact property with indium tin oxide (ITO) and indium zinc oxide (IZO), for example, a molybdenum (Mo)-based metal, chromium (Cr), titanium (Ti), tantalum (Ta), and/or the like.

An example of the combination of two or more conducting layers may include a chromium lower layer and an aluminum upper layer, an aluminum lower layer and a molybdenum upper layer, a titanium lower layer and a copper upper layer, and the like. However, the gate-layer conductor 120 may include or be formed of any suitable metals and conductors.

The gate-layer conductor 120 may include gate wirings 121 and 122, storage wirings 123, 124, and 125, gate protrusion patterns 126 and 127, and the like. The gate-layer conductor 120 may be simultaneously formed in a same process.

The gate wirings 121 and 122 may include a gate line 121 extending in a direction, for example, a first direction D1, and a gate electrode 122 extending in a second direction D2 which intersects the first direction D1. The gate line 121 may transmit a gate signal, and the gate electrode 122, along with a source electrode 153 and a drain electrode 155 to be described below, constitutes three terminals of a thin film transistor TR.

The storage wirings 123, 124, and 125 may include a horizontal portion 123 extending in a direction, for example, the first direction D1, a vertical portion 124 extending in the second direction D2 from the horizontal portion 123, and a shielding portion 125.

The horizontal portion 123 and the vertical portion 124 may extend along at least one side of the pixel electrode 180 to be described below, and may or may not overlap the pixel electrode 180. In the case of overlapping the pixel electrode 180, the horizontal portion 123 and the vertical portion 124 may overlap the pixel electrode 180 along an edge of the pixel electrode 180 so as to prevent a decrease in aperture ratio.

The shielding portion 125 may be disposed below a contact hole 175 that connects the drain electrode 155 and the pixel electrode 180. A position of the shielding portion 125 may vary based on a shape of the thin film transistor TR and a shape of the pixel electrode 180. In an alternative exemplary embodiment, the shielding portion 125 may not be connected to any conductor (e.g., a gate wiring, a data wiring, a storage wiring, and a pixel electrode) including the horizontal portion 123. The shielding portion 125 may efficiently reduce or prevent effects of light provided by the backlight unit on the pixel electrode 180.

The gate protrusion patterns 126 and 127 may include a first gate protrusion pattern 126 extending in the first direction D1 and a second gate protrusion pattern 127 extending in the second direction D2 intersecting the first direction D1. The gate protrusion patterns 126 and 127 may together form a cross shape in a plan view. An overlapping area C of the first gate protrusion pattern 126 and the second gate protrusion pattern 127 may have a shape selected from a quadrangle, a circle, an ellipse, and a lozenge in a plan view.

The gate protrusion patterns 126 and 127 may not be connected to any conductor (e.g., a gate wiring, a data wiring, a storage wiring, and a pixel electrode). For example, the gate protrusion patterns 126 and 127 may float electrically.

The gate protrusion patterns 126 and 127 may have a thickness in a range of about 0.1 μm to about 1.0 μm, and may have a width W1 in a range of about 2 μm to about 15 μm.

In FIG. 3, the gate protrusion patterns 126 and 127 are depicted as having a same width W1. However, the width W1 of the first gate protrusion pattern 126 and the second gate protrusion pattern 127 may increase or decrease as a distance from the overlapping area C increases, for example, from the overlapping area C toward at least one end portion thereof.

In an exemplary embodiment, the first gate protrusion pattern 126 and the second gate protrusion pattern 127 may have different widths from each other. For example, the first gate protrusion pattern 126 may have a width greater than a width of the second protrusion pattern 127.

The gate protrusion patterns 126 and 127 may be provided to form bump portions 186 and 187 on the pixel electrode 180 to be described below, and may have substantially the same shape as a shape of the bump portions 186 and 187 in a plan view. In addition, the gate protrusion patterns 126 and 127 may be disposed to correspond to boundaries among domains DM1, DM2, DM3, and DM4 to be described below and, thus, may be capable of preventing light leakage.

A first insulating layer 130 may be disposed over the base substrate 110 on which the gate-layer conductor 120 is formed. The first insulating layer 130 may also be referred to as a gate insulating layer. The first insulating layer 130 may include silicon oxide ($SiO_x$) or silicon nitride ($SiN_x$), for example. In an exemplary embodiment, the first insulating layer 130 may further include, for example, aluminum oxide, titanium oxide, tantalum oxide, or zirconium oxide.

The semiconductor layer 140 may be disposed over the first insulating layer 130. The semiconductor layer 140 may include semiconductor materials such as, for example, amorphous silicon or polycrystalline silicon. In an exemplary embodiment, the semiconductor layer 140 may include an oxide semiconductor such as IGZO, ZnO, $SnO_2$, $In_2O_3$, $Zn_2SnO_4$, $Ge_2O_3$, or $HfO_2$, and may include a compound semiconductor such as GaAs, GaP, or InP, for example.

In an exemplary embodiment, the semiconductor layer 140 is depicted as substantially overlapping the gate electrode 122. However, the semiconductor layer 140 may substantially overlap the data wirings 151, 153, and 155 to be described below.

Figure 4:
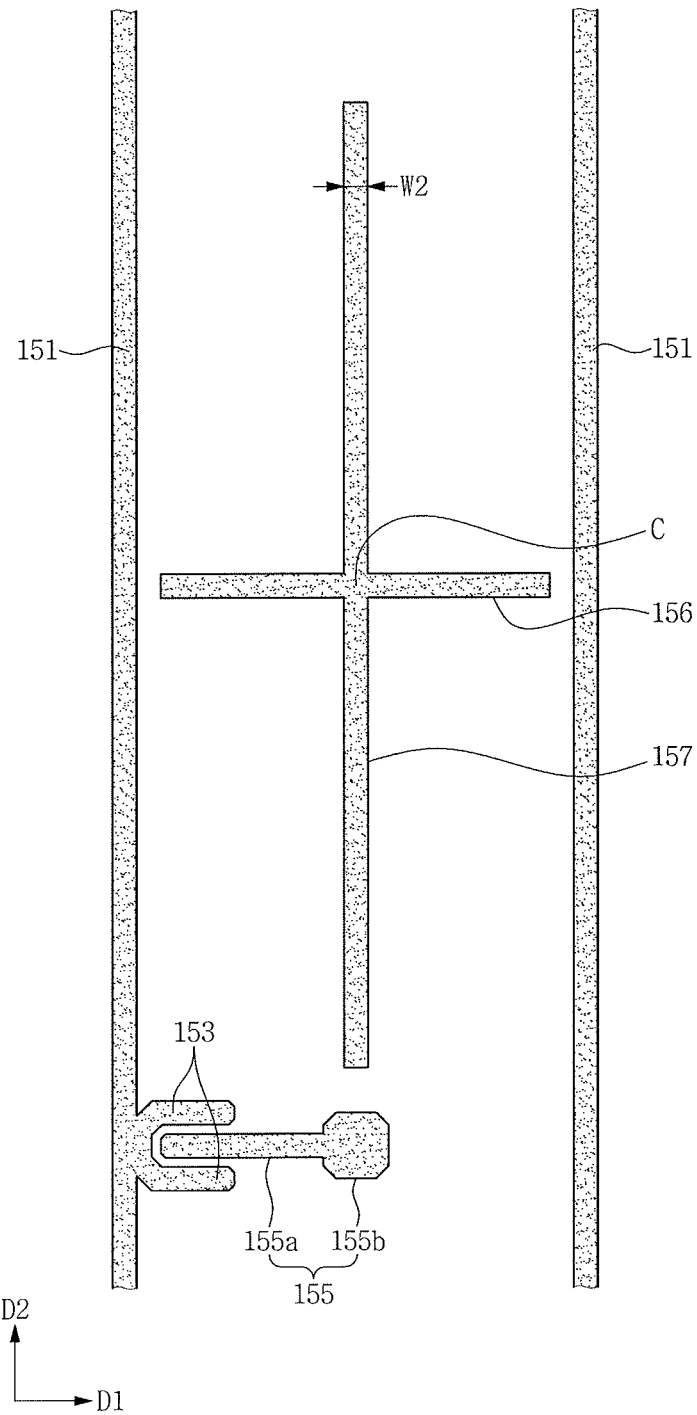
FIG. 4 illustrates a plan view separately illustrating a data-layer conductor of FIG. 1.

FIG. 4 is a plan view separately illustrating the data-layer conductor 150 of FIG. 1.

In reference to FIGS. 1, 2, and 4, the data-layer conductor 150 may be disposed over the base substrate 110 on which the semiconductor layer 140 may be formed. The data-layer conductor 150 may include or be formed of a same material as that of the aforementioned gate-layer conductor 120.

The data-layer conductor 150 may include the data wirings 151, 153, and 155 and the data protrusion patterns 156 and 157. The data-layer conductor 150 may be simultaneously formed in a same process.

The data wirings 151, 153, and 155 may include a data line 151 extending in a direction that intersects the gate line 121, for example, the second direction D2, a source electrode 153 branching off from the data line 151 and extending onto the semiconductor layer 140, and a drain electrode 155 spaced apart from the source electrode 153 and overlapping a portion of the semiconductor layer 140.

An ohmic contact layer may further be disposed between the source electrode 153 and the semiconductor layer 140 and/or between the drain electrode 155 and the semiconductor layer 140 so as to improve electric properties.

The drain electrode 155 may include a first drain electrode 155a overlapping a portion of the semiconductor layer 140 and a second drain electrode 155b connected to the first drain electrode 155a and having a polygonal shape.

A channel through which electric charges are transmitted during operation of the thin film transistor TR may be formed in the semiconductor layer 140 between the source electrode 153 and the drain electrode 155.

The data protrusion patterns 156 and 157 may include a first data protrusion pattern 156 extending in the first direction D1 and a second data protrusion pattern 157 extending in the second direction D2 intersecting the first direction D1. The data protrusion patterns 156 and 157 may together form a cross shape in a plan view. An overlapping area C of the first data protrusion pattern 156 and the second data protrusion pattern 157 may have a shape selected from a quadrangle, a circle, an ellipse, and a lozenge in a plan view in a plan view.

The data protrusion patterns 156 and 157 may not be connected to any conductor (e.g., a gate wiring, a data wiring, a storage wiring, and a pixel electrode). For example, the data protrusion patterns 156 and 157 may float electrically.

The data protrusion patterns 156 and 157 may have a thickness in a range of about 0.1 µm to about 1.0 µm, and may have a width W2 in a range of about 2 µm to about 15 µm.

In FIG. 4, the data protrusion patterns 156 and 157 are depicted as having a same width W2. However, the width W2 of the first data protrusion pattern 156 and the second data protrusion pattern 157 may increase or decrease as a distance from the overlapping area C increases, for example, from the overlapping area C toward at least one end portion thereof.

In an exemplary embodiment, the first data protrusion pattern 156 and the second data protrusion pattern 157 may have different widths. For example, the first data protrusion pattern 156 may have a width greater than a width of the second data protrusion pattern 157.

The data protrusion patterns 156 and 157 may be provided to form the bump portions 186 and 187 on the pixel electrode 180 to be described below, and may have substantially the same shape as a shape of the bump portions 186 and 187 in a plan view. In addition, the data protrusion patterns 156 and 157 may be disposed to correspond to the boundaries among the domains DM1, DM2, DM3, and DM4 to be described below and, thus, may be capable of preventing light leakage.

A second insulating layer 160 may be disposed over the base substrate 110 on which the data-layer conductor 150 is formed. The second insulating layer 160 may have a monolayer structure or a multilayer structure including, for example, silicon oxide, silicon nitride, a photosensitive organic material, or a low dielectric constant insulating material such as a-Si:C:O or a-Si:O:F.

Figure 5:
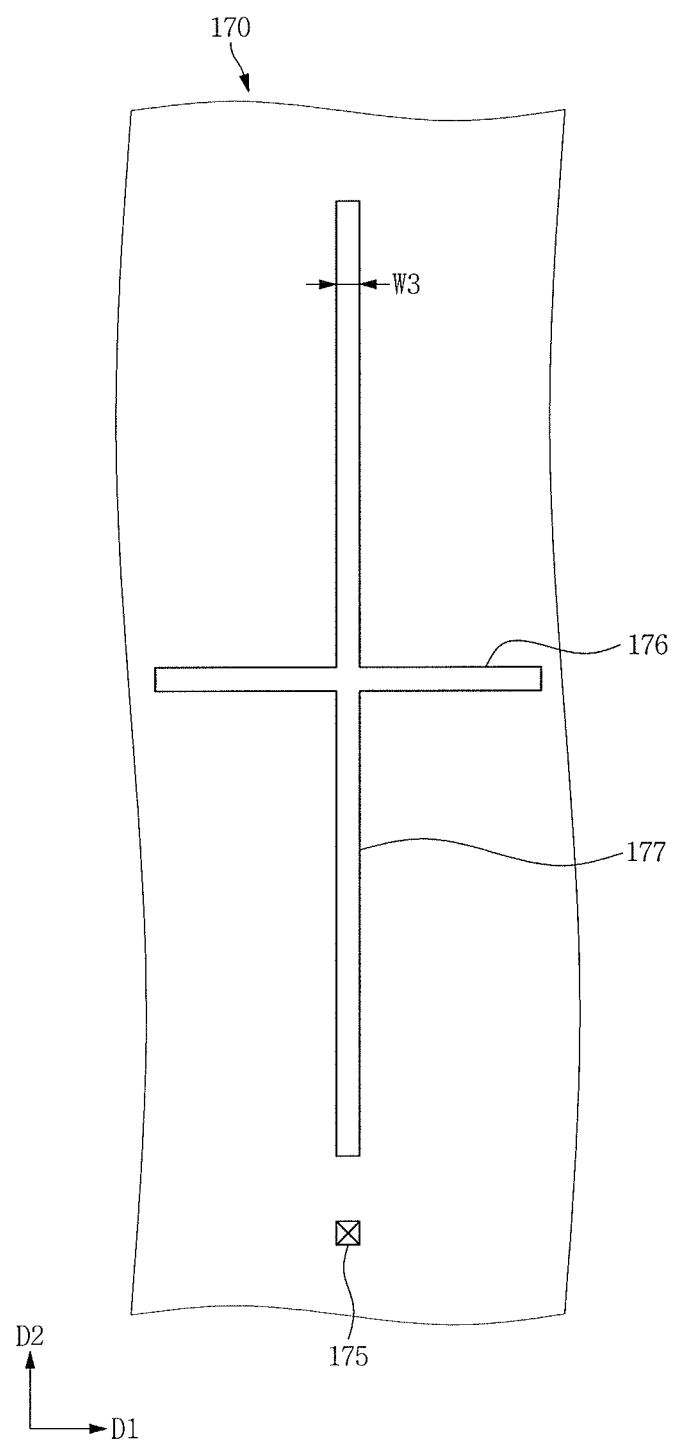
FIG. 5 illustrates a plan view separately illustrating a third insulating layer of FIG. 1.

FIG. 5 is a plan view separately illustrating the third insulating layer 170 of FIG. 1.

In reference to FIGS. 1, 2, and 5, the third insulating layer 170 may be disposed over the second insulating layer 160.

The third insulating layer 170 may include an organic insulating layer or an inorganic insulating layer. For example, the third insulating layer 170 may be a color filter. The color filter may be one of red, green, blue, cyan, magenta, yellow, and white, for example. The three primary colors of red, green, and blue or cyan, magenta, and yellow may constitute a base pixel group for color formation.

The third insulating layer 170 may include the contact hole 175 exposing a portion of the second drain electrode 155b and projections 176 and 177. The third insulating layer 170 may protrude to form the projections 176 and 177.

In an exemplary embodiment, the third insulating layer 170 may protrude due to at least one of the gate protrusion pattern 127 and the data protrusion pattern 157 described above, thereby forming the projections 176 and 177. In an exemplary embodiment, the projections 176 and 177 may be formed aside from the gate protrusion pattern 127 and the data protrusion pattern 157 when the third insulating layer 170 is patterned. In an exemplary embodiment, the projections 176 and 177 may be formed along with, for example, a column spacer or a black matrix when the column spacer or the black matrix is patterned.

The projections 176 and 177 may include a first projection 176 extending in the first direction D1 and a second projection 177 extending in the second direction D2 intersecting the first direction D1. The projections 176 and 177 may together form a cross shape in a plan view. An overlapping area C of the first projection 176 and the second projection 177 may have a shape selected from a quadrangle, a circle, an ellipse, and a lozenge in a plan view.

The projections 176 and 177 may have a height in a range of about 0.1 µm to about 1.0 µm, and may have a width W3 in a range of about 2 µm to about 15 µm.

In FIG. 5, the projections 176 and 177 are depicted as having a same width W3. However, the width W3 of the first projection 176 and the second projection 177 may increase or decrease as a distance from the overlapping area C increases, for example, from the overlapping area C toward at least one end portion thereof.

In an exemplary embodiment, the first projection 176 and the second projection 177 may have different widths. For example, the first projection 176 may have a width greater than a width of the second projection 177.

The projections 176 and 177 may be provided to form the bump portions 186 and 187 on the pixel electrode 180 to be described below, and may have substantially the same shape as a shape of the bump portions 186 and 187 in a plan view.

A capping layer may further be disposed over the third insulating layer 170. The capping layer may serve to prevent permeation of contaminants into the liquid crystal layer 300. The capping layer may include or be formed of, for example, an organic material or an inorganic material such as silicon nitride (SiNx), silicon oxide (SiOx), carbon-injected silicon oxide (SiOC), or the like.

Figure 6:
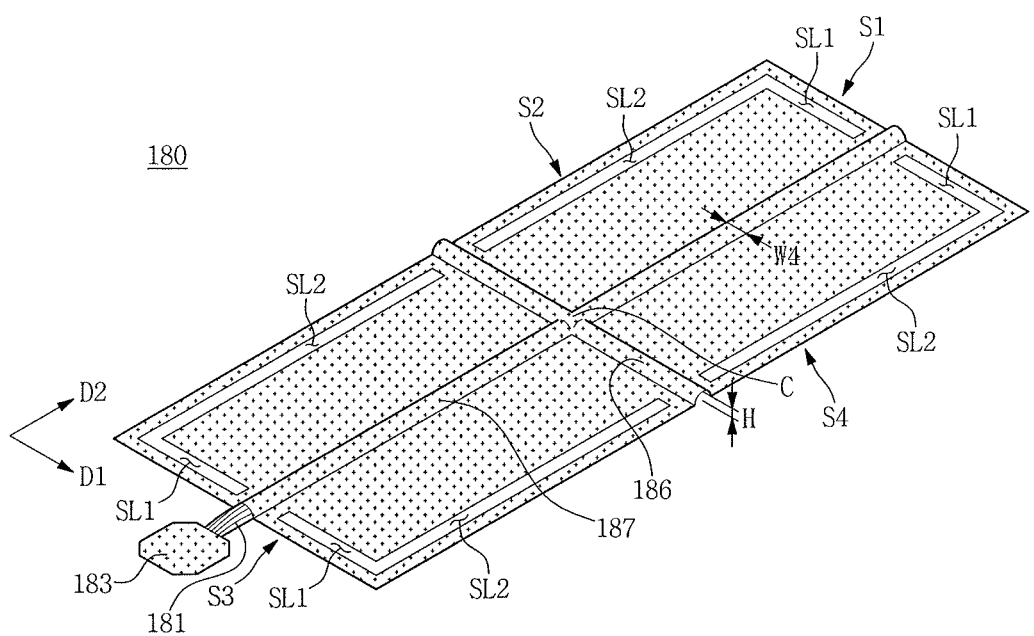
FIG. 6 illustrates a perspective view separately illustrating a pixel electrode of FIG. 1.

FIG. 6 is a perspective view separately illustrating the pixel electrode 180 of FIG. 1.

In reference to FIGS. 1, 2, and 6, the pixel electrode 180 may be disposed over the third insulating layer 170. The pixel electrode 180 may be an electrode including or be formed of a transparent conductor such as indium tin oxide (ITO) or indium zinc oxide (IZO), for example. The pixel electrode 180 may have a rectangular shape having first, second, third, and fourth sides S1, S2, S3, and S4.

The base substrate 110 may have a plurality of pixel areas PA, and the pixel electrode 180 may be disposed in each of the pixel areas PA.

The pixel area PA may be divided into the plurality of domains DM1, DM2, DM3, and DM4 arranged in a matrix form. However, the pixel area PA may be divided into a plurality of domains arranged in any suitable manners.

The pixel electrode 180 may include the bump portions 186 and 187 for defining the plurality of domains DM1, DM2, DM3, and DM4.

The bump portions 186 and 187 may include a first bump portion 186 extending in the first direction D1 and a second bump portion 187 extending in the second direction D2 intersecting the first direction D1. The bump portions 186 and 187 may together form a cross shape in a plan view. An overlapping area C of the first bump portion 186 and the second bump portion 187 may have a shape selected from a quadrangle, a circle, an ellipse, and a lozenge in a plan view.

The bump portions 186 and 187 may have a height H in a range of about 0.1 µm to about 1.0 µm, and may have a width W4 in a range of about 2 µm to about 15 µm.

In FIG. 6, the bump portions 186 and 187 are depicted as having a same width W4. However, the width W4 of the first bump portion 186 and the second bump portion 187 may gradually increase or decrease as a distance from the overlapping area C increases, for example, from the overlapping area C toward at least one end portion thereof.

In an exemplary embodiment, the first bump portion 186 and the second bump portion 187 may have different widths. For example, the first bump portion 186 may have a width greater than a width of the second bump portion 187.

In addition, the pixel electrode 180 may include a connecting portion 181 parallelly extending outwards from at least one of the first bump portion 186 and the second bump portion 187, and a pixel electrode contact portion 183 connected to the connecting portion 181 and having a polygonal shape. The pixel electrode contact portion 183 may be connected to the second drain electrode 155b through the contact hole 175.

Figure 7:
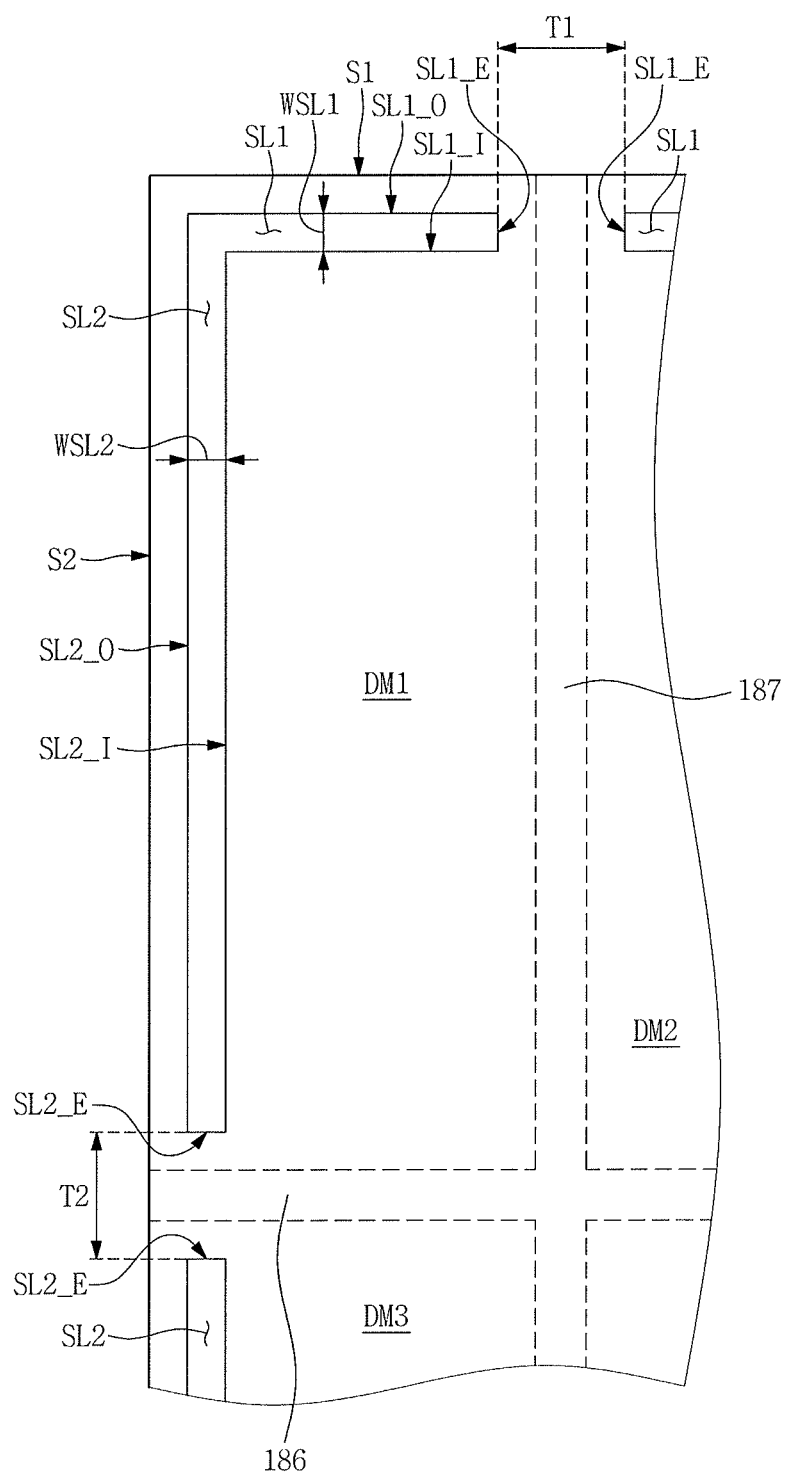
FIG. 7 illustrates a partial enlarged view illustrating a portion of a pixel electrode of FIG. 5.

FIG. 7 is a partial enlarged view illustrating a portion of the pixel electrode 180 of FIG. 5.

In reference to FIGS. 1, 2, 6, and 7, the pixel electrode 180 may have a rectangular shape having first, second, third, and fourth sides S1, S2, S3, and S4 in a plan view, and may have at least one slit, for example, a first slit SL1 and a second slit SL2, extending along the first, second, third, and fourth sides S1, S2, S3, and S4.

The pixel electrode 180 may have, in the plurality of domains DM1, DM2, DM3, and DM4, the first slit SL1 formed in the first direction D1 and the second slit SL2 formed in the second direction D2 intersecting the first direction D1.

The slits, for example, the first slit SL1 and the second slit SL2, may be formed symmetrically with respect to the first bump portion 186 and the second bump portion 187 and, thus, the first slit SL1 and the second slit SL2 formed in the first domain DM1 will be representatively described.

The first slit SL1 may be defined as adjacent to the first side Si.

Hereinafter, for ease of description, a side of the first slit SL1 adjacent to the first side S1 is referred to as a first-slit outer side SL1_O, a side of the first slit SL1 relatively distanced from the first side S1 is referred to as a first-slit inner side SL1_I, and a side of the first slit SL1 adjacent to the second bump portion 187 is referred to as a first-slit end side SL1_E.

The first-slit outer side SL1_O and the first-slit inner side SL1_I may be substantially parallel to the first side S1, and the first-slit end side SL1_E may be substantially parallel to the second side S2.

However, in an exemplary embodiment, the first-slit inner side SL1_I may have a predetermined angle with respect to the first side S1, and the first-slit end side SL1_E may have a predetermined angle with respect to the first side S1.

In addition, a width WSL1 of the first slit SL1 may be in a range of about 2 μm to about 5 μm, and in an alternative exemplary embodiment, the width WSL1 of the first slit SL1 may gradually increase from an edge of the pixel electrode 180 toward the second bump portion 187.

The second slit SL2 may be defined as adjacent to the second side S2.

Hereinafter, for ease of description, a side of the second slit SL2 adjacent to the second side S2 is referred to as a second-slit outer side SL2_O, a side of the second slit SL2 relatively distanced from the second side S2 is referred to as a second-slit inner side SL2_I, and a side of the second slit SL2 adjacent to the first bump portion 186 is referred to as a second-slit end side SL2_E.

The second-slit outer side SL2_O and the second-slit inner side SL2_I may be substantially parallel to the second side S2, and the second-slit end side SL2_E may be substantially parallel to the first side S1.

However, the second-slit inner side SL2_I may have a predetermined angle with respect to the second side S2, and the second-slit end side SL2_E may have a predetermined angle with respect to the second side S2.

In an exemplary embodiment, a width WSL2 of the second slit SL2 may be in a range of about 2 μm to about 5 μm, and in an alternative exemplary embodiment, the width WSL2 of the second slit SL2 may gradually increase from an edge of the pixel electrode 180 toward the first bump portion 186.

The width WSL1 of the first slit SL1 and the width WSL2 of the second slit SL2 may be the same as or different from each other. For example, the width WSL1 of the first slit SL1 may be larger than the width WSL2 of the second slit SL2.

The first slit SL1 and the second slit SL2 may be connected to or separated from each other at the edge of the pixel electrode 180. In addition, the first slit SL1 and the second slit SL2 may overlap a portion of the first bump portion 186 and the second bump portion 187.

A gap T1 between the first slit SL1 of the first domain DM1 and the first slit SL1 of the second domain DM2 and a gap T2 between the second slit SL2 of the first domain DM1 and the second slit SL2 of the third domain DM3 may be at least about 2 μm or more.

In reference to FIGS. 1 and 2, the first alignment layer 190 may be disposed over the pixel electrode 180. When an electric field is absent between the display substrate 100 and the opposing substrate 200, the first alignment layer 190 may align liquid crystal molecules 301 included in the liquid crystal layer 300 corresponding to inclination of the first alignment layer 190. The first alignment layer 190 may be, for example, a homeotropic alignment layer or a photo-alignment layer including photo-polymerization materials. An LCD device in which a photo-alignment layer is utilized may be defined to be in a photo-alignment mode.

In a case where the liquid crystal molecules 301 of the liquid crystal layer 300 are disposed over the first alignment layer 190, the liquid crystal molecules 301 may have pre-tilts in the first, second, third, and fourth alignment directions DR1, DR2, DR3, and DR4 due to the first bump portion 186 and the second bump portion 187 of the pixel electrode 180. For example, the liquid crystal molecules 301 in the four adjacent domains DM1, DM2, DM3, and DM4 may be aligned in directions converging toward the center of the pixel electrode 180 in a plan view. The liquid crystal layer 300 may include, for example, a reactive monomer or a polymer material that is photo-polymerized by a reactive mesogen.

A reactive monomer may be included in the liquid crystal molecules 301 to polymerize the reactive monomer while applying an electric field thereover in the process of manufacturing the LCD device. When ultraviolet ("UV") light is irradiated to the reactive monomer, the liquid crystal molecules 301 of the liquid crystal layer 300 may be aligned to have different pre-tilts for each domain. An LCD device that includes such liquid crystal molecules 301 may be defined to be in a surface stabilized vertical alignment ("SVA") mode. The LCD device in the SVA mode may display an image with a short response time.

The opposing substrate 200 may include an opposing base substrate 210, a light blocking member 220, an overcoat layer 230, a common electrode 240, and the like. The opposing substrate 200 may further include a second alignment layer 250.

The opposing base substrate 210 may be an insulating substrate, for example, a plastic substrate, which has light transmission and flexible characteristics. However, the base substrate 110 may include, for example, a hard substrate such as a glass substrate.

The light blocking member 220 may be disposed over the opposing base substrate 210. The light blocking member 220 may also be referred to as black matrix, and may include or be formed of, for example, a metal such as chrome oxide (CrOx), an opaque organic layer material, and the like.

The light blocking member 220 may have a plurality of apertures substantially similar to the pixel area PA so that light provided from the backlight unit may be transmitted through the pixel area PA. In addition, the light blocking member 220 may be formed in portions corresponding to the thin film transistor TR formed on the base substrate 110. However, the light blocking member 220 may be disposed over the base substrate 110.

The overcoat layer 230 may be disposed over the light blocking member 220 and the opposing base substrate 210. The overcoat layer 230 may planarize an uneven surface of a layer therebelow, for example, the light blocking member 220, and efficiently suppress or prevent exudation of undesired materials from the layer therebelow.

The common electrode 240 may be disposed over the overcoat layer 230. The common electrode 240 may be a whole-plate electrode including or be formed of a transparent conductor, for example, indium tin oxide ("ITO") or indium zinc oxide ("IZO"). In an alternative exemplary embodiment, the common electrode 240 may have an uneven portion or at least one slit to define the plurality of domains.

Hereinafter, other exemplary embodiments will be described with reference to FIGS. 8, 9, 10, 11, 12, 13, 14, 15, and 16.

Herein, descriptions described hereinabove with reference to the first exemplary embodiment will be omitted in the descriptions with regard to other exemplary embodiments. It is to be understood that combinations of two or more exemplary embodiments, along with each exemplary embodiment itself, are included in the scope of the embodiments.

Figure 8:
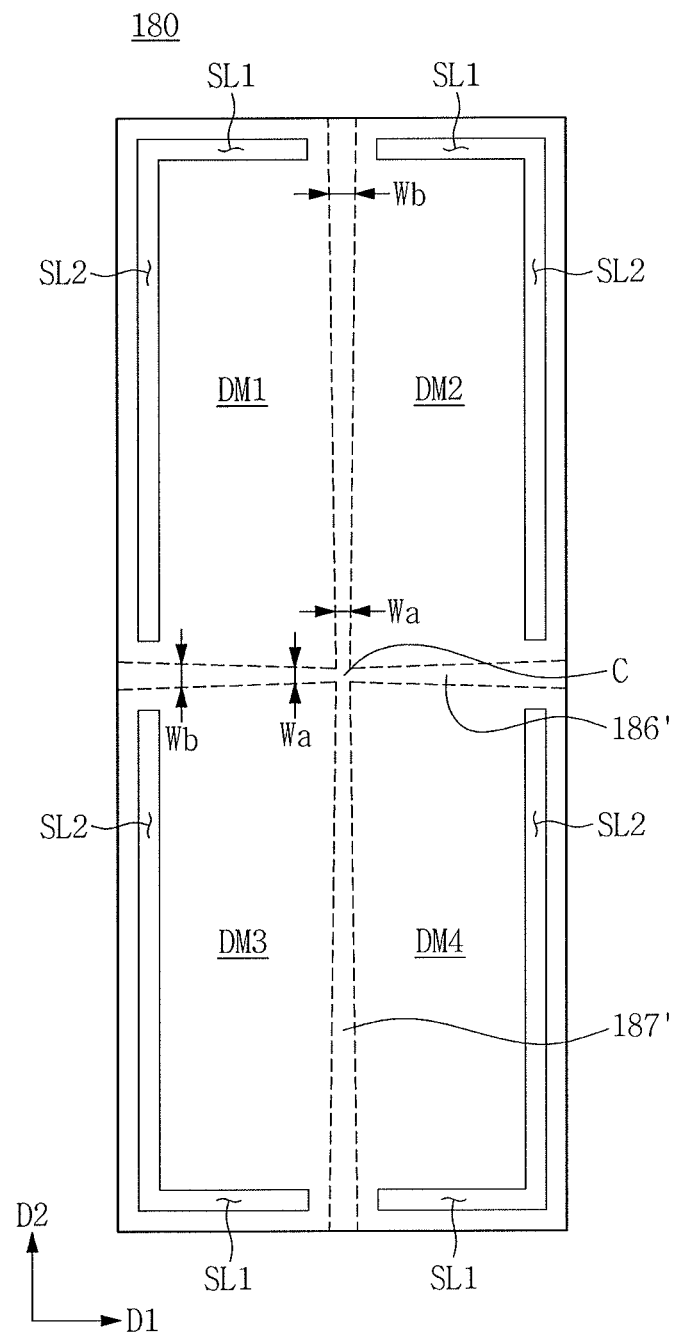
FIGS. 8, 9, 10, 11, 12, 13, 14, 15, and 16 illustrate plan views illustrating pixel electrodes according to second to tenth exemplary embodiments, respectively.
Figure 9:
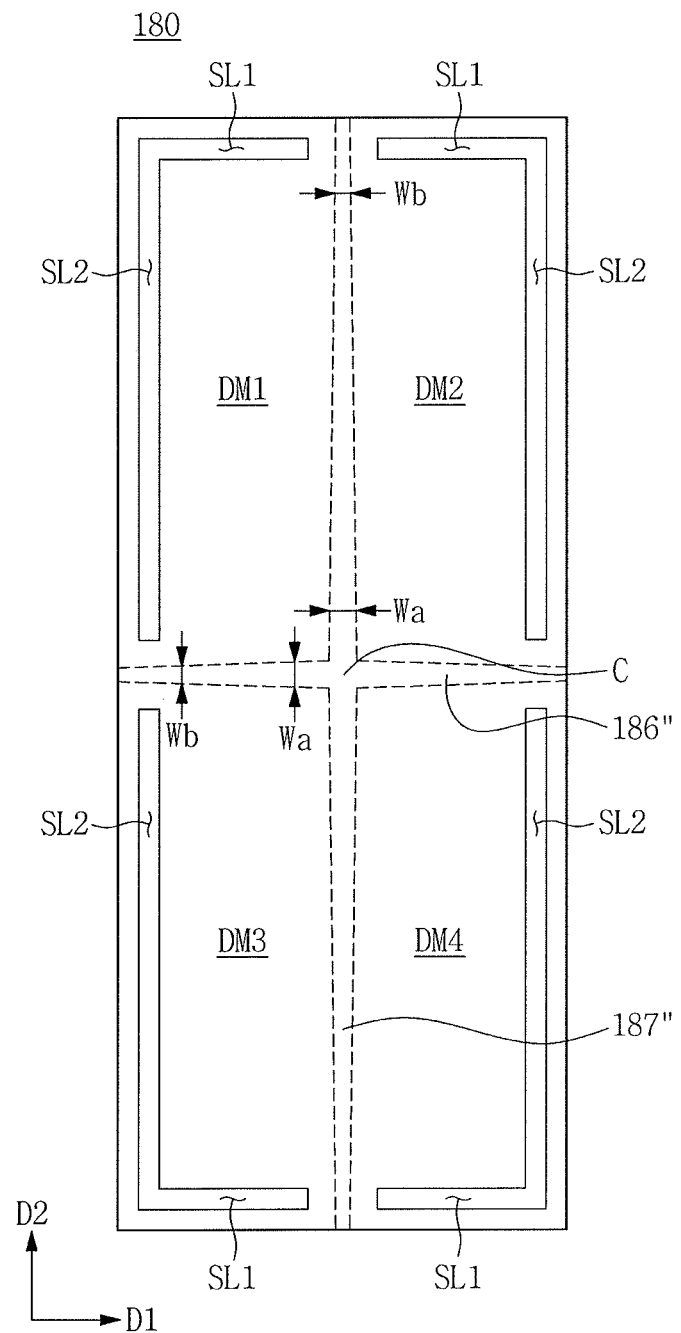
Figure 10:
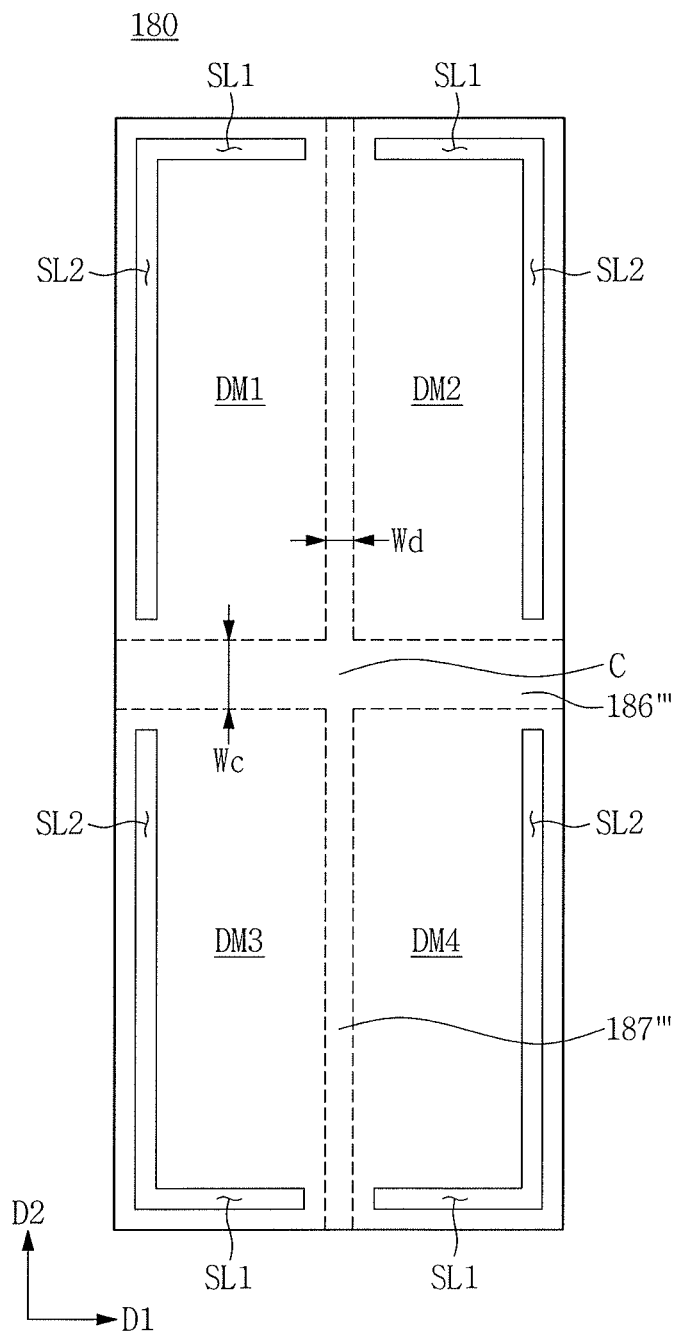

FIGS. 8, 9, and 10 are plan views illustrating pixel electrodes 180 according to second, third, and fourth exemplary embodiments, respectively. In FIGS. 8, 9, and 10, configurations of a connecting portion, a pixel electrode contact portion, and the like of the pixel electrode 180 are omitted.

In reference to FIGS. 8, 9, and 10, the pixel electrode 180 may include bump portions 186 and 187 for defining a plurality of domains DM1, DM2, DM3, and DM4, and a first slit SL1 and a second slit SL2 in the plurality of domains DM1, DM2, DM3, and DM4. The first slit SL1 may be formed in a first direction D1 and the second slit SL2 may be formed in a second direction D2 intersecting the first direction D1.

The bump portions 186 and 187 may include a first bump portion 186 extending in the first direction D1 and a second bump portion 187 extending in the second direction D2 intersecting the first direction D1. The bump portions 186 and 187 may together form a cross shape in a plan view, and an overlapping area C of the first bump portion 186 and the second bump portion 187 may have a shape selected from a quadrangle, a circle, an ellipse, and a lozenge in a plan view.

In FIG. 8, widths of the first bump portion 186' and the second bump portion 187' of the pixel electrode 180 according to the second exemplary embodiment increase gradually as a distance from the overlapping area C increases, for example, from the overlapping area C toward end portions thereof. In an exemplary embodiment, a width Wa of portions of the first bump portion 186' and the second bump portion 187' adjacent to the overlapping area C and a width Wb of portions of the first bump portion 186' and the second bump portion 187' distanced from the overlapping area C by a predetermined distance may have a ratio in a range of about 1:1.5 to about 1:2.

In an exemplary embodiment, in a case where the width Wa of portions of the first bump portion 186' and the second bump portion 187' adjacent to the overlapping area C is 3 µm, the width Wb of portions of the first bump portion 186' and the second bump portion 187' distanced from the overlapping area C by a predetermined distance may be in a range of about 4.5 µm to about 6 µm.

In FIG. 9, widths of the first bump portion 186" and the second bump portion 187" of the pixel electrode 180 according to the third exemplary embodiment decrease gradually as a distance from the overlapping area C increases, for example, from the overlapping area C toward end portions thereof. In an exemplary embodiment, a width Wa of portions of the first bump portion 186" and the second bump portion 187" adjacent to the overlapping area C and a width Wb of portions of the first bump portion 186" and the second bump portion 187" distanced from the overlapping area C by a predetermined distance may have a ratio in a range of about 1.5:1 to about 2:1.

In an exemplary embodiment, in a case where the width Wa of portions of the first bump portion 186" and the second bump portion 187" adjacent to the overlapping area C is 5 µm, the width Wb of portions of the first bump portion 186" and the second bump portion 187" distanced from the overlapping area C by a predetermined distance may be in a range of about 2.5 µm to about 3 µm.

In FIG. 10, in the pixel electrode 180 according to the fourth exemplary embodiment, the first bump portion 186''' may have a width Wc that is different from a width Wd of the second bump portion 187'''. In an exemplary embodiment, the width Wc of the first bump portion 186''' may be greater than the width Wd of the second bump portion 187'''. The width Wc of the first bump portion 186''' and the width Wd of the second bump portion 187''' may have a ratio in a range of about 1.5:1 to about 2:1.

In an exemplary embodiment, in a case where the width Wc of the first bump portion 186''' is 5 µm, the width Wd of the second bump portion 187''' may be in a range of about 2.5 µm to about 3 µm.

FIGS. 11, 12, 13, and 14 are plan views illustrating pixel electrodes 180 according to fifth, sixth, seventh, and eighth exemplary embodiments, respectively. In FIGS. 11, 12, 13, and 14, configurations of a connecting portion, a pixel electrode contact portion, and the like of the pixel electrode 180 are omitted.

In reference to FIGS. 11, 12, 13, and 14, the pixel electrode 180 may have a rectangular shape having first, second, third, and fourth sides S1, S2, S3, and S4 in a plan view. The pixel electrode 180 may include bump portions 186 and 187 for defining a plurality of domains DM1, DM2, DM3, and DM4, and a first slit SL1 and a second slit SL2 in the plurality of domains DM1, DM2, DM3, and DM4. The first slit SL1 may be formed in a first direction D1 and the second slit SL2 may be formed in a second direction D2 intersecting the first direction D1.

The bump portions 186 and 187 may include a first bump portion 186 extending in the first direction D1 and a second bump portion 187 extending in the second direction D2 intersecting the first direction D1.

The slits, for example, the first slit SL1 and the second slit SL2, may be formed symmetrically with respect to the first bump portion 186 and the second bump portion 187, and thus the first slit SL1 and the second slit SL2 formed in the first domain DM1 will be representatively described.

Figure 11:
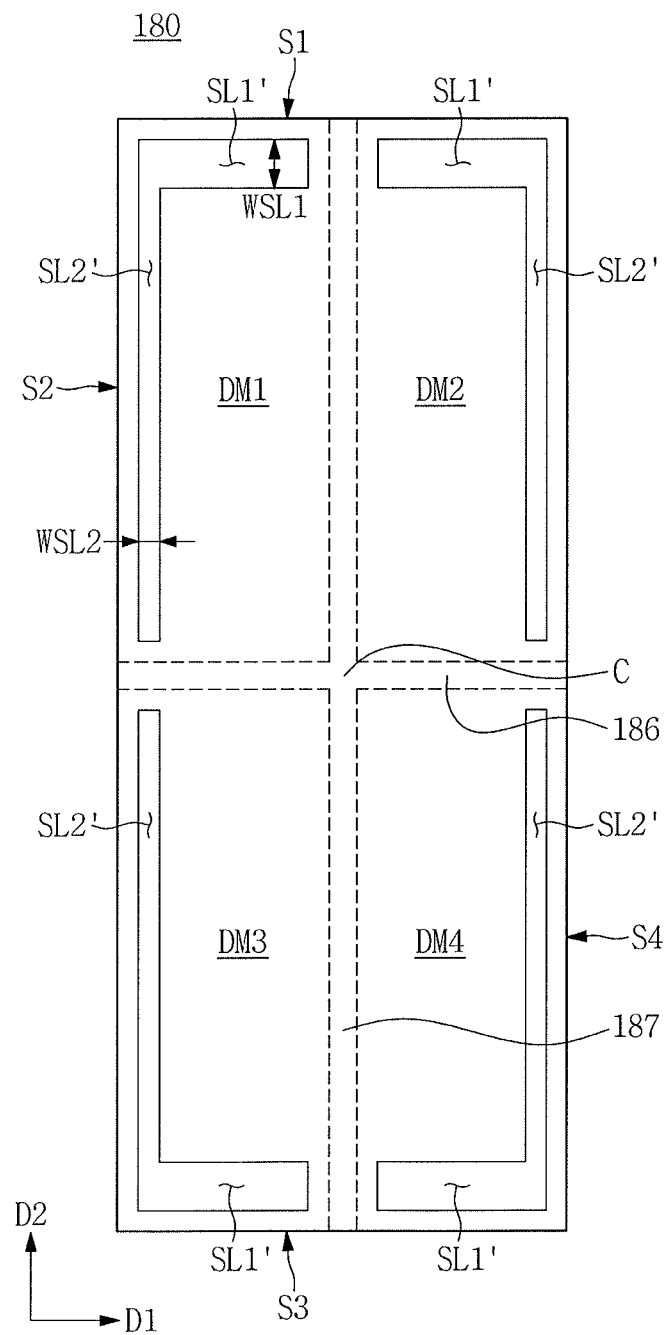

In reference to FIG. 11, in the pixel electrode 180 according to the fifth exemplary embodiment, a width WSL1 of the first slit SL1' and a width WSL2 of the second slit SL2' may be different from each other.

For example, the width WSL1 of the first slit SL1' may be greater than the width WSL2 of the second slit SL2'. In such an embodiment, the width WSL1 of the first slit SL1' and the width WSL2 of the second slit SL2' may have a ratio in a range of about 1.5:1 to about 2:1. Accordingly, in a case where the width WSL1 of the first slit SL1 is 5 µm, the width WSL2 of the second slit SL2 may be in a range of about 2.5 µm to about 3 µm.

Figure 12:
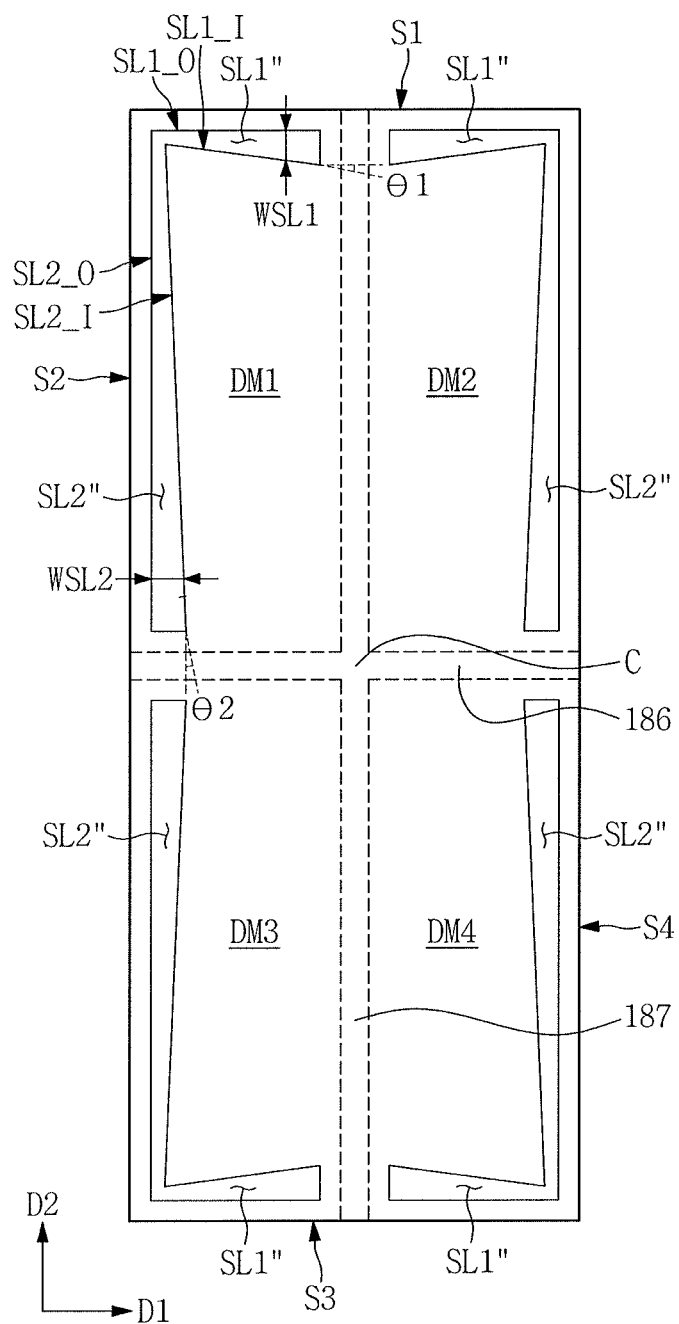

In reference to FIG. 12, in the pixel electrode 180 according to the sixth exemplary embodiment, a first-slit outer side SL1_O may be substantially parallel to the first side S1, and a first-slit inner side SL1_I may have a first angle $\theta_1$ with respect to the first side S1. In an exemplary embodiment, the first angle $\theta_1$ may be an acute angle. For example, the width WSL1 of the first slit SL1" may gradually increase from an edge of the pixel electrode 180 toward the second bump portion 187.

In addition, in the pixel electrode 180, a second-slit outer side SL2_O may be substantially parallel to the second side S2, and a second-slit inner side SL2_I may have a second angle $\theta_2$ with respect to the second side S2. For example, the second angle $\theta_2$ may be an acute angle. For example, the width WSL2 of the second slit SL2" may gradually increase from an edge of the pixel electrode 180 toward the first bump portion 186.

Figure 13:
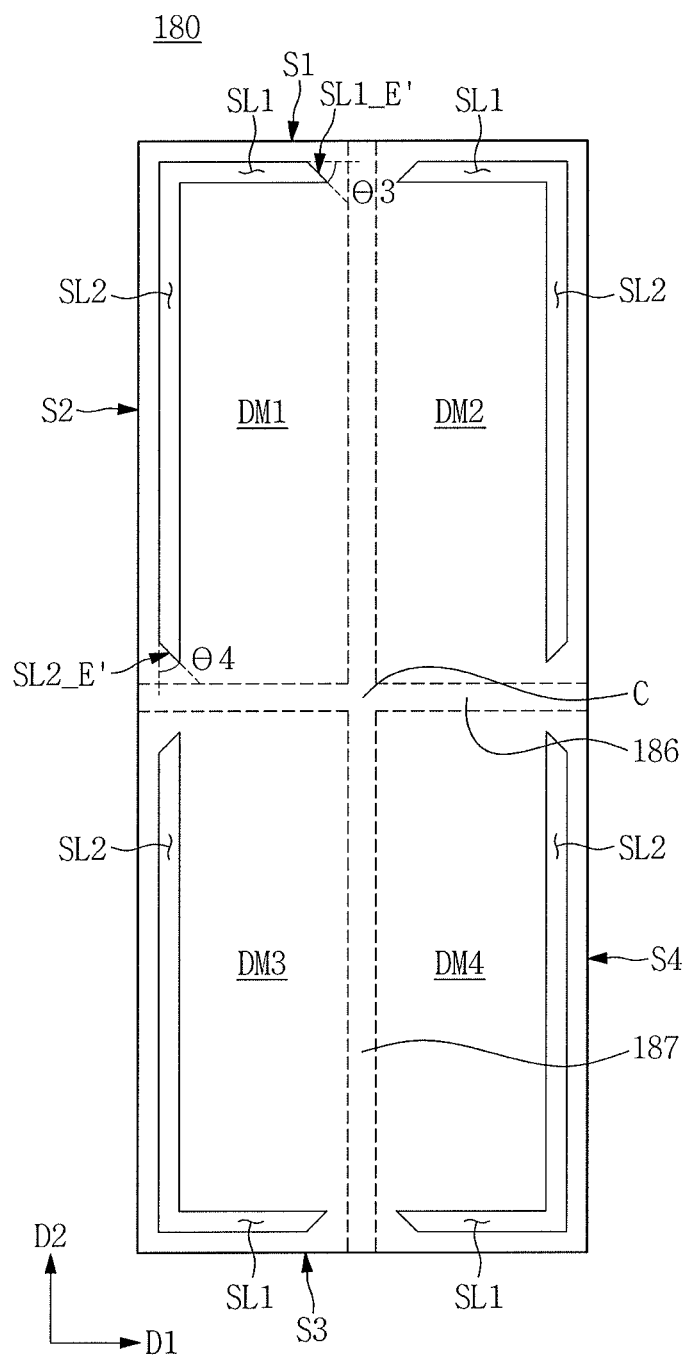

In reference to FIG. 13, in the pixel electrode 180 according to the seventh exemplary embodiment, a first-slit end side SL1_E' may have a third angle $\theta_3$ with respect to the first side S1. In addition, a second-slit end side SL2_E' may have a fourth angle $\theta_4$ with respect to the second side S2. The third angle $\theta_3$ and the fourth angle $\theta_4$ may each be acute angles.

Figure 14:
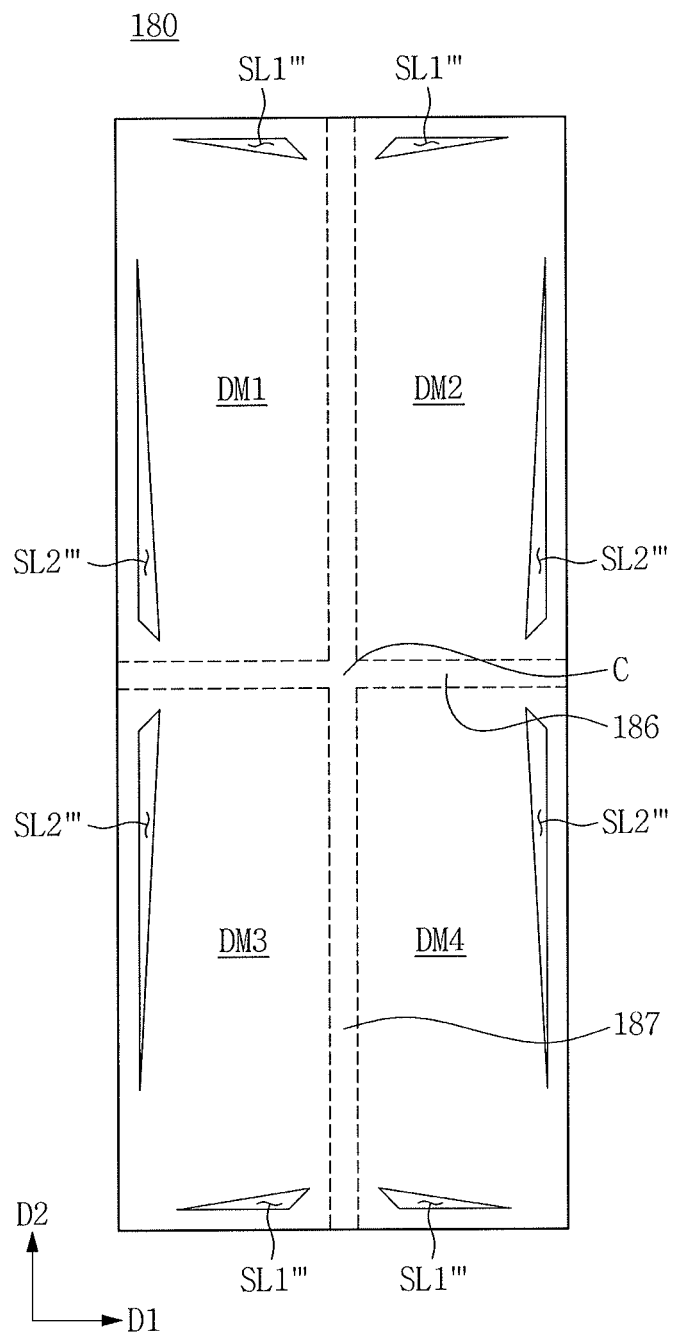

In reference to FIG. 14, in the pixel electrode 180 according to the eighth exemplary embodiment, the first slit SL1''' and the second slit SL2''' may be separated from each other at an edge of the pixel electrode 180.

Figure 15:
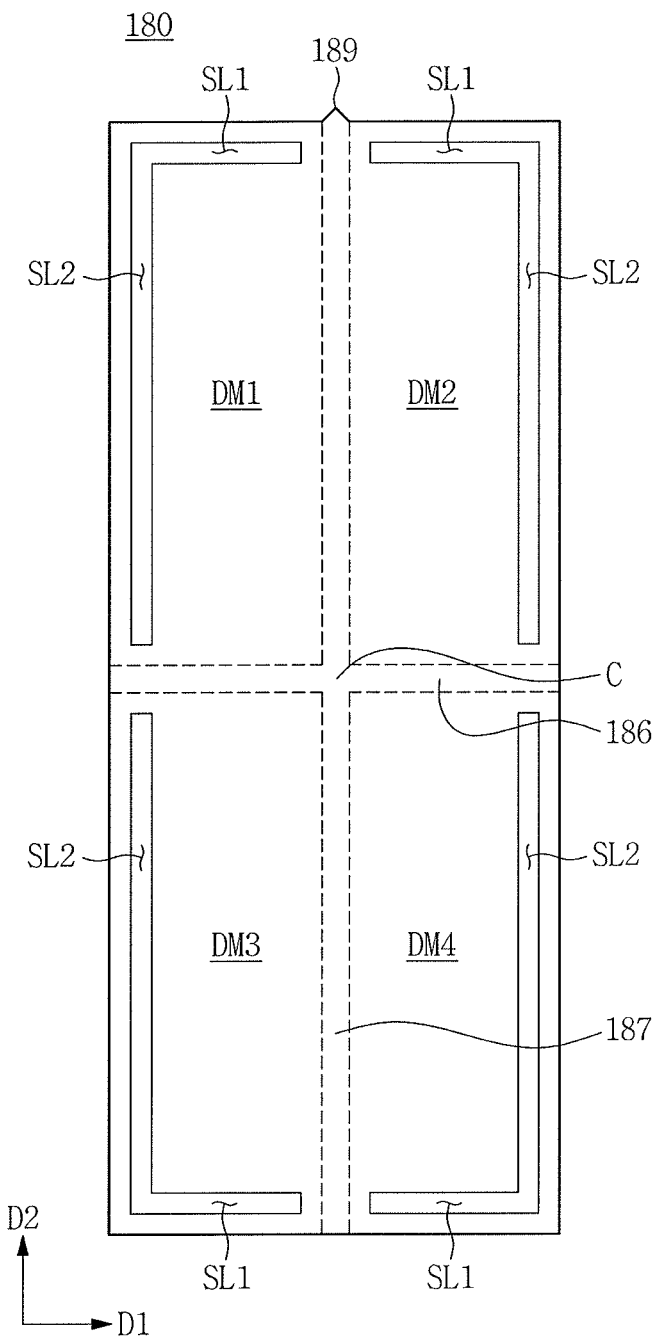
Figure 16:
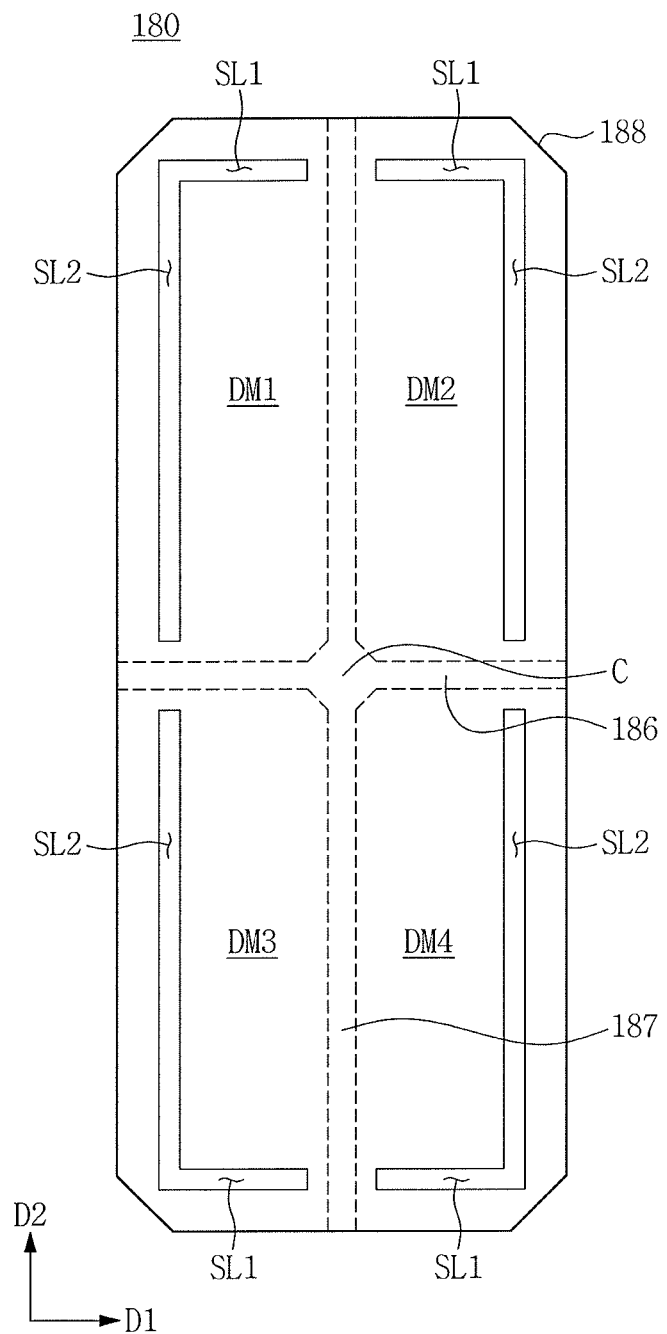

FIGS. 15 and 16 are plan views illustrating pixel electrodes 180 according to ninth and tenth exemplary embodiments, respectively. In FIGS. 15 and 16, configurations of a connecting portion, a pixel electrode contact portion, and the like of the pixel electrode 180 are omitted.

In reference to FIGS. 15 and 16, the pixel electrode 180 may include bump portions 186 and 187 for defining a plurality of domains DM1, DM2, DM3, and DM4, and a first slit SL1 and a second slit SL2 in the plurality of domains DM1, DM2, DM3, and DM4. The first slit SL1 may be formed in a first direction D1 and the second slit SL2 may be formed in a second direction D2 intersecting the first direction D1. The bump portions 186 and 187 may include a first bump portion 186 extending in the first direction D1 and a second bump portion 187 extending in the second direction D2 intersecting the first direction D1.

In reference to FIG. 15, the pixel electrode 180 according to the ninth exemplary embodiment may further include a notch portion 189 extending outwardly of the pixel electrode 180 from at least one of the first bump portion 186 and the second bump portion 187. The notch portion 189 may have a shape selected from a triangle, a semi-circle, and a semi-ellipse.

In reference to FIG. 16, the pixel electrode 180 according to the tenth exemplary embodiment may have at least one edge including a chamfer 188, and an overlapping area C of the first bump portion 186 and the second bump portion 187 may have a lozenge shape in a plan view.

By way of summation and review, attempts have been made to improve viewing angle characteristics of an LCD by defining a pixel region as multi-domains and by imparting pre-tilts to liquid crystal molecules in respective ones of the multi-domains in different directions, respectively. For example, LCD devices may apply a photo-alignment mode and a surface stabilized vertical alignment ("SVA") mode.

In such a case, a fringe field may be generated at a boundary portion of each domain and, due to the fringe field, texture may appear at the edge portion of each domain during operation of the LCD device.

Example embodiments are directed to a display device that may efficiently reduce or prevent generation of texture at an edge portion of each domain.

In particular, and as set forth hereinabove, the LCD device according to one or more exemplary embodiments may efficiently reduce or prevent texture by improving control of liquid crystal molecules at an edge portion of each domain and may, thereby, improve transmittance and visibility of the LCD device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display substrate comprising:
   a base substrate having a plurality of pixel areas; and
   a pixel electrode in the pixel area,
   wherein the pixel electrode includes:
      a bump portion defining a plurality of domains in the pixel electrode, and
      at least one slit extending along and parallel to an edge of the pixel electrode in at least one domain of the plurality of domains, the at least one slit being closed by the pixel electrode.

2. The display substrate as claimed in claim 1, wherein the bump portion includes a first bump portion extending in a first direction and a second bump portion extending in a second direction intersecting the first direction in a plan view.

3. The display substrate as claimed in claim 2, wherein an overlapping area of the first bump portion and the second bump portion has a shape of a quadrangle, a circle, an ellipse, or a lozenge in a plan view.

4. The display substrate as claimed in claim 3, wherein at least one of the first bump portion and the second bump portion has a width that increases as a distance from the overlapping area increases.

5. The display substrate as claimed in claim 3, wherein the first bump portion and the second bump portion have widths that decrease as a distance from the overlapping area increases.

6. The display substrate as claimed in claim 2, wherein the first bump portion has a width different from a width of the second bump portion.

7. The display substrate as claimed in claim 6, wherein the first bump portion has a width greater than a width of the second bump portion.

8. The display substrate as claimed in claim 1, wherein the bump portion has a width in a range of about 2 μm to about 15 μm.

9. The display substrate as claimed in claim 1, wherein the bump portion has a height in a range of about 0.1 μm to about 1.0 μm.

10. The display substrate as claimed in claim 1, further comprising at least one insulating layer between the base substrate and the pixel electrode, the insulating layer including a projection having a substantially same shape as a shape of the bump portion in a plan view.

11. The display substrate as claimed in claim 1, further comprising at least one protrusion pattern on the base substrate, the protrusion pattern having a substantially same shape as a shape of the bump portion in a plan view.

12. The display substrate as claimed in claim 11, wherein the protrusion pattern includes a first protrusion pattern on the base substrate and a second protrusion pattern on the first protrusion pattern, the second protrusion pattern being insulated from the first protrusion pattern.

13. The display substrate as claimed in claim 1, wherein the at least one slit includes a first slit formed in a first direction and a second slit formed in a second direction, the first and second slits being connected with each other.

14. The display substrate as claimed in claim 13, wherein at least one of the first slit and the second slit has a width that increases from the edge of the pixel electrode toward the bump portion.

15. The display substrate as claimed in claim 13, wherein at least one of the first slit and the second slit overlaps the bump portion.

16. The display substrate as claimed in claim 13, wherein the first slit has a width different from a width of the second slit.

17. The display substrate as claimed in claim 16, wherein the first slit has a width greater than a width of the second slit.

18. The display substrate as claimed in claim 13, wherein an end side of the first slit forms an acute angle with respect to the first direction.

19. The display substrate as claimed in claim 13, wherein an end side of the second slit forms an acute angle with respect to the second direction.

20. The display substrate as claimed in claim 1, wherein the at least one slit has a width in a range of about 2 μm to about 5 μm.

21. The display substrate as claimed in claim 1, wherein the pixel electrode further includes a notch portion extending from one side of the pixel electrode.

22. The display substrate as claimed in claim 21, wherein the notch portion is connected to the bump portion.

23. The display substrate as claimed in claim 21, wherein the notch portion has a width that decreases as a distance from the pixel electrode increases.

24. The display substrate as claimed in claim 1, wherein the pixel electrode further includes a connecting portion connected to the bump portion and to be connected to a thin film transistor.

25. The display substrate as claimed in claim 1, wherein the pixel electrode has at least one edge that is chamfered.

26. A liquid crystal display ("LCD") device comprising:
a display substrate;
an opposing substrate facing the display substrate; and
a liquid crystal layer between the display substrate and the opposing substrate,
wherein the display substrate includes the display substrate as claimed in claim 1.

* * * * *